Jan. 29, 1963
SVEN-OLOF ÖSTERMAN  3,075,985
METHOD OF EXTRACTING NON-NEUTRAL CONSTITUENTS
FROM ORGANIC MATERIALS
Filed Aug. 21, 1958
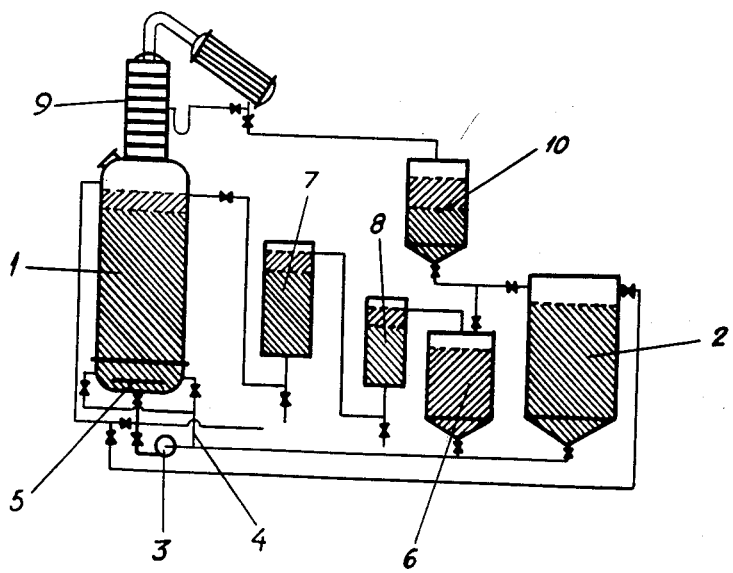
INVENTOR
SVEN-OLOF ÖSTERMAN
BY Sol Shappirio
ATTORNEY 3,075,985
METHOD OF EXTRACTING NON-NEUTRAL CONSTITUENTS FROM ORGANIC MATERIALS
Sven-Olof Österman, 4 Asvagen, Sodertalje, Sweden
Filed Aug. 21, 1958, Ser. No. 756,387
Claims priority, application Sweden Aug. 24, 1957
5 Claims. (Cl. 260—292)

This invention relates to a method of extracting non-neutral constituents from organic materials.

More particularly this invention relates to a method of extracting alkaline constituents from vegetable substances.

Still more particularly this invention relates to a method of extracting alkaloidal constituents from vegetable substances.

This invention is an improvement of the known method of initially leaching out the constituents from the substances by means of water and subsequently extracting said constituents from said water by means of organic solvents. In known methods the organic material is initially treated several times with relatively large quantities of water. These quantities of water are collected and reduced to a more handsome volume by evaporation and subsequently the constituents leached out are extracted from the concentrated water solution by means of the organic solvents. The known methods thus imply a plurality of separate steps and for this reason are complicated, time-wasting and expensive.

One main object of the present invention is to provide a method which is considerably simpler than the known methods.

A further object of the invention is to provide a method which operates continuously and draws less operation costs than the known multi-step methods.

A still further object of the invention is to provide a continuous method in which a relatively low quantity of leaching water is used and any evaporation made superfluous.

A still further object of the invention is to avoid non-desired formation of emulsions which often disturb technical extraction methods.

A still further object of the invention is to provide a method which is capable of being carried out in a simple apparatus without mechanical agitators.

These and other objects and advantages of the invention will become apparent in connection with the following description of a preferred application of the method to the preparation of raw morphine from ground poppy capsules by means of an extraction apparatus shown diagrammatically in the accompanying drawing.

Referring to the drawing, 1 denotes an extraction vessel and 2 a storage tank connected thereto through a conduit provided with a pump denoted by 3. A further storage tank 6 is connected to the conduit leading from the storage tank 2 to the pump 3. From said pump 3 a conduit enters the extraction vessel 1 at the bottom thereof and is connected adjacent said bottom to a pair of cross-wise arranged tubes provided with perforations preferably at the lower side of said tubes. Below a perforated horizontally extending partition plate a shunt conduit 4 connects the base portion of the vessel 1 with the conduit connecting the storage tanks 2 and 6 with the pump 3. The part of the extraction vessel 1 below the perforated horizontal partition wall preferably houses fillers such as Raschig rings. The top portion of the extraction vessel 1 is connected by a conduit with the base of a second extraction vessel 7 the top of which is connected by a conduit with the base of a settling tank 8 from the top portion of which a conduit extends to the top of the storage tank 6. Located on the top of the extraction tank 1 is a fractionating column 9 the central portion of which directly and the top portion of which over a cooler is connected to the top of a receiver 10 from the base of which valve-controlled conduits lead to both the storage tank 2 and the storage tank 6.

All conduits are provided with suitable valve means so as to make possible control of the flows between the vessels.

The apparatus described operates as follows. The extraction vessel 1 which suitably is cylindrical and has a diameter of about 1 meter and a height of between 2 and 2.5 meters, is filled with dry ground poppy capsules from the perforated partition plate to a predetermined level which suitably is determined to be between one-half to three-fourths the height of the vessel. From the storage tank 2 an alkaline aqueous solution of ammonia or a similar basic substance the pH of which solution is adjusted between 9 and 10 is fed into the vessel 1 in a quantity sufficient to ensure thorough impregnation of the ground poppy capsules and in excess to rise to a water level approximately 10 centimeters higher than the upper surface of the ground poppy capsules. To achieve this result the quantity of liquid supplied is suitably between 3 and 6 times larger than the dry weight of the ground capsules. A quantity amounting to 4 or 5 times the dry weight of the capsules has proved to be particularly advantageous. This liquid from the storage tank 2 leaches out part of the raw morphine from the ground poppy capsules by diffusion until a balance is attained.

Thereupon the pump 3 the feeding capacity of which in the embodiment illustrated should be greater than about 6 liters per minute is caused to supply organic solvent of a lower density than that of water from the storage tank 6 at a rate of 3 liters per minute. When extracting thereover morphine from ground poppy capsules a mixture of even quantities of benzene and butanol has proved to be highly suitable. To this organic solvent an equal quantity of alkaline aqueous solution discharged from the extraction vessel 1 through the shunt conduit 4 at the rate of 3 liters per minute is admixed. The mixture of organic solvent is emulgated in the water of said solution and the emulsion is distributed by means of the cross-wise arranged tubes 5 over the total cross-sectional area of the extraction vessel 1. With the feeding rate set out hereinbefore the quantity of solvent at any moment present in the extraction vessel will amount to about one-tenth of the water content of the leaching liquid in the extraction vessel. This emulsion, since it has a lower density than the alkaline aqueous solution present in the extraction vessel 1, rises in small drops through the wet content constituted by the impregnated poppy capsules and the alkaline aqueous solution. During this rising movement the emulsion is caused to decompose and the solvent again free from water is collected above the level of the alkaline aqueous solution as a separate layer containing in solution the raw morphine which primarily had been leached out from the poppy capsules, and thereafter is extracted from said alkaline aqueous solution by the small rising drops of solvent. By this extraction the balance of distribution in the material filling the extraction vessel is disturbed, which causes further diffusion of raw morphine from the poppy capsules into the leaching alkaline aqueous solution. This further morphine is extracted in turn by fresh solvent fed in an emulgated state into the vessel 1 by the pump 3 through the cross-wise arranged tubes 5.

The mixture of solvents collected in the top portion of the extraction vessel 1 is discharged therefrom at the same rate as introduced to the base by the pump 3 into the second extraction vessel 7 where it is separated from the morphine dissolved therein by treatment with an aqueous solution of an acid. In the example described the acid solution preferably is constituted by sulfuric acid of a strength of between 5 and 10% by weight. The solvent is then fed into the vessel 8 where its pH is adjusted by suitable pH adjusting agents familiar to everybody skilled in the art to the same pH value which it had when leaving the storage tank 6 whereupon the solvent mixture is returned to the storage tank 6 for further use.

The continuous extraction described is continued until substantially all morphine extractable from the charge of ground poppy capsules present in the extraction vessel 1 had been recovered. Thereupon solvent dissolved in the liquid phase in the poppy capsules can be recovered in a simple manner by blowing steam into the extraction vessel through the cross-wise arranged tubes 5. The mixture of steam and solvent rises into and is concentrated in the column 9 and therefrom discharged into the receiver 10 where it is allowed to settle. One phase is discharged into the storage tank 2 and the other into the storage tank 6. The alkaline liquid not soaked up by the treated content of the extraction vessel 1 is also returned to the storage tank 2 for further use together with fresh alkaline liquid.

The method embodying the invention may be used also for the extraction of constituents of organic material and in particular alkaloidal substances from other vegetables. As an example the preparation of cocaine from coca leaves may be mentioned. In this case also the combined leaching by diffusion and extraction is effected in an alkaline liquid having a pH of about 9–10, the solvent used being preferably benzene and the recovery therefrom being effected by diluted sulfuric acid having a strength of about eight percents by weight. In a similar manner cinchona bark may be treated for the recovery of quinine, the alkaline leaching liquid being an aqueous solution of ammonia with a pH between 9 and 10, the solvent used benzene and the agent for the recovery from the solvent diluted hydrochloric acid in a concentration of about seven percents weight. In the treatment of roots of belladonna for the recovery of atropine the combined leaching and extraction operation is effected in an alkaline liquid having a pH of about 9–10, the solvent used suitably being constituted by butanol or other multivalid alcohols, the recovery from the solvent preferably being effected by means of diluted sulfuric acid in a concentration of between 5 and 10 percents by weight.

When extracting acid organic compounds the extraction is effected in slightly acid liquids and the constituents are recovered from the organic solvent or solvents by means of an alkaline substance.

It is easily understood that one condition for the application of the method according to the invention is that the substance to be extracted has either alkaline or acid properties and possesses at the utmost low solubility in the either feebly alkaline or fully acid aqueous solution used for the leaching out by diffusion of the organic constituent from the vegetable material, whereas the solvent or solvents should be non-soluble in water or at least difficultly soluble therein. A further indispensible condition is that the solvent has minor density than water in order to be capable to rise in the extraction vessel.

When desiring to shorten the continuous extraction several washings or leaching out treatments of the partly extracted organic material may be made. In these treatments it is suitable not to use a larger total quantity of water than that contained in the total quantity of alkaline liquid absorbed by said organic material with due regard to the quantity of water collecting in the receiver 10 as a result of the distillation of the solvent.

While several more or less specific embodiments of the invention have been described it is to be understood that this is for purpose of illustration only and that the invention is not to be limited thereby, but its scope is to be determined by the appended claims.

What I claim is:

1. In a method of extracting non-neutral constituent salts of an alkaloid selected from the group consisting of morphine, cocaine, quinine and atropine contained in disintegrated plant material selected from the group consisting of poppy capsules, coca leaves, cinchona bark and belladonna roots by leaching out said salts by a water extractant at a slightly alkaline pH, leaching the salts from said water extractant by an organic solvent immiscible with and of lower density than said water extractant and known as a good solvent for said constituent salt, and separating said constituent salt from said solvent by a known separating agent, the improvement comprising the steps of adjusting the pH of the water extractant to slightly alkaline pH to give substantially the known minimum solubility of said substituent salt in water, filling an extraction zone to more than one-half, but less than completely full with the disintegrated plant material continuously circulating said organic solvent through said material, maintaining the level of the water extractant above the level of the plant material and bubbling through the extractant a quantity of the solvent less than the body of water extractant in said extraction zone, thereby forming a layer of dissolved salt in solvent above the solution.

2. The method of extracting an alkaloid non-neutral constituent salt soluble in water from disintegrated plant material containing the salt by extracting the plant material with an aqueous solution of ammonia at a pH of about 9 to 10, extracting the constituent salt from the water extract in an extraction zone with a known organic solvent therefor which solvent is substantially immiscible with water and has a density lower than that of the above mentioned water extractant, the amount of organic solvent in the extraction zone at any one time being less than the amount of water extractant therein in which the constituent salt is morphine, the disintegrated plant material is poppy capsules, and the solvent is benzene and butanol in equal parts.

3. The method of extracting an alkaloid non-neutral constituent salt soluble in water from disintegrated plant material containing the salt by extracting the plant material with an aqueous solution of ammonia at a pH of about 9 to 10, extracting the constituent salt from the water extract in an extraction zone with a known organic solvent therefor which solvent is substantially immiscible with water and has a density lower than that of the above mentioned water extractant, the amount of organic solvent in the extraction zone at any one time being less than the amount of water extractant therein in which the alkaloid is cocaine, the disintegrated plant material is coca leaves, and the solvent is benzene.

4. The method of extracting an alkaloid non-neutral constituent salt soluble in water from disintegrated plant material containing the salt by extracting the plant material with an aqueous solution of ammonia at a pH of about 9 to 10, extracting the constituent salt from the water extract in an extraction zone with a known organic solvent therefor which solvent is substantially immiscible with water and has a density lower than that of the above mentioned water extractant, the amount of organic solvent in the extraction zone at any one time being less than the amount of water extractant therein in which the alkaloid is quinine, the disintegrated plant material is cinchona bark, and the solvent is benene.

5. The method of extracting an alkaloid non-neutral constituent salt soluble in water from disintegrated plant material containing the salt by extracting the plant material with an aqueous solution of ammonia at a pH of about 9 to 10, extracting the constituent salt from the water extract in an extraction zone with a known organic solvent therefor which solvent is substantially immiscible with water and has a density lower than that of the above mentioned water extractant, the amount of organic solvent in the extraction zone at any one time being less than the amount of water extractant therein in which the alkaloid is atropine, the disintegrated plant material is belladonna roots, and the solvent is butanol.

References Cited in the file of this patent

UNITED STATES PATENTS

| | | |
|---|---|---|
| 1,048,712 | Lloyd | Dec. 31, 1912 |
| 2,252,709 | Folkers | Aug. 19, 1941 |
| 2,273,031 | Folkers | Feb. 17, 1942 |
| 2,740,787 | Mehltretter | Apr. 3, 1956 |

OTHER REFERENCES

Mascre—Chem. Abstracts, vol. 44, col. 2174–8 (1950).

Manske et al.—The Alkaloids, vol. 1, pp. 8–11 (1950), Academic Press Inc., N.Y.

Weissberger—Technique of Org. Chem., vol. III, Part I, pp. 228–229 (1956).